(12) United States Patent
Kumagai et al.

(10) Patent No.: US 6,445,446 B1
(45) Date of Patent: Sep. 3, 2002

(54) SURVEYING INSTRUMENT

(75) Inventors: Kaoru Kumagai; Fumio Ohtomo, both of Tokyo (JP)

(73) Assignee: Kabushiki Kaisha Topcon (JP)

( * ) Notice: Subject to any disclaimer, the term of this patent is extended or adjusted under 35 U.S.C. 154(b) by 0 days.

(21) Appl. No.: 09/461,975

(22) Filed: Dec. 15, 1999

(30) Foreign Application Priority Data

Dec. 16, 1998 (JP) .............................. 10-375763

(51) Int. Cl.[7] .......................... G01B 11/26; G01C 1/00; G01C 21/02
(52) U.S. Cl. ............................... 356/139.04; 250/203.2; 356/139.07; 356/141.1
(58) Field of Search ........................ 356/139.04, 141.1, 356/152.3, 139.07; 250/203.1, 203.7, 206.1, 206.3

(56) References Cited

U.S. PATENT DOCUMENTS

| | | | | |
|---|---|---|---|---|
| 4,600,305 A | * | 7/1986 | Priddy | |
| 5,559,322 A | * | 9/1996 | Jacoby et al. | 250/203.1 |
| 5,770,850 A | * | 6/1998 | Bowen | 250/203.1 |
| 5,900,620 A | * | 5/1999 | Livingston | 250/203.2 |

* cited by examiner

Primary Examiner—Stephen C. Buczinski
(74) Attorney, Agent, or Firm—Baker Botts LLP

(57) ABSTRACT

A photodetecting system for an automatic surveying instrument equipped with an automatic tracking system is capable of controlling the automatic surveying instrument by simple photodetecting means. A collimating optical system collimates the surveying instrument with respect to an object, a splitting optical device splits incident light rays received from the collimating optical system into light rays that travel toward first and second photodetecting devices, respectively, a first light condensing device disposed on an optical path between the first photodetecting device and the splitting optical device gathers the light rays in a first direction, and a second light condensing device disposed on an optical path between the second photodetecting device and the splitting optical device gathers the light rays in a second direction perpendicular to the first direction.

3 Claims, 5 Drawing Sheets

SURVEYING INSTRUMENT

BACKGROUND OF THE INVENTION

The present invention relates to a photodetecting system for a surveying instrument equipped with an automatic tracking device and, more particularly, to a photodetecting system for a surveying instrument, capable of controlling the collimation of the surveying instrument by simple photodetecting means.

There are surveying instruments provided with an automatic tracking device. An automatic surveying instrument disclosed in Japanese Patent Laid-open No. Hei 5-322569 is capable of tracking an object to measure the position of the object and comprises encoders for electrically measuring horizontal angle and vertical angle, a range finer, a collimator and a tracking device. A body is driven for turning in a horizontal plane by a motor, and the collimator is turned in a vertical plane by a motor.

The collimator emits distance measuring light for measuring the distance between the surveying instrument and the object, and tracking light for tracking the object. The object is provided with a reflecting prism for reflecting the distance measuring light and the tracking light.

In the known automatic surveying instrument, however, the intensity of the tracking light, as well as that of the distance measuring light, is limited by the overall size of the automatic surveying instrument and necessity for securing safety, and a substantially collimated beam of light must be moved at a high speed for scanning in a range to track and detect a long-distance object.

The high-speed scanning needs a high-speed scanning means, such as an acoustooptic device or a galvanometer mirror, to realize high-speed scanning. Consequently, the construction of the automatic surveying instrument becomes complicated, the body becomes large and power consumption increases inevitably. A laser beam must be moved vertically and horizontally for high-speed scanning by a high-speed scanning means, such as a galvanometer mirror or the like, the automatic surveying instrument has very complicated construction and is expensive and uneconomical.

Another tracking method may use image processing instead of high-speed scanning. A scanning method using image processing processes an image taken by a television camera mounted on a telescope to extract a reflecting prism position and direct the surveying instrument toward a collimation center. However, although there is no structural difficulty in mounting the television camera on the surveying instrument, the tracking method using image processing needs a large-scale, complicated electric circuit for image processing. Such an electric circuit is difficult to build in the surveying instrument, consumes much power and needs an external power supply.

SUMMARY OF THE INVENTION

The present invention provides a photodetecting system for a surveying instrument, capable of controlling the collimation of the surveying instrument by simple photodetecting means. A collimating optical system collimates a telescope toward an object, a splitting optical device splits incident light received from the collimating optical system and directs split beams of light toward a first photodetector and a second photodetector, a first condensing device disposed on an optical axis between the first photodetector and the splitting optical device gathers light in a first direction, a second condensing device disposed on an optical axis between the second photodetector and the splitting optical system gathers light in a second direction perpendicular to the first direction.

DESCRIPTION OF THE PREFERRED EMBODIMENTS

Figure 1:
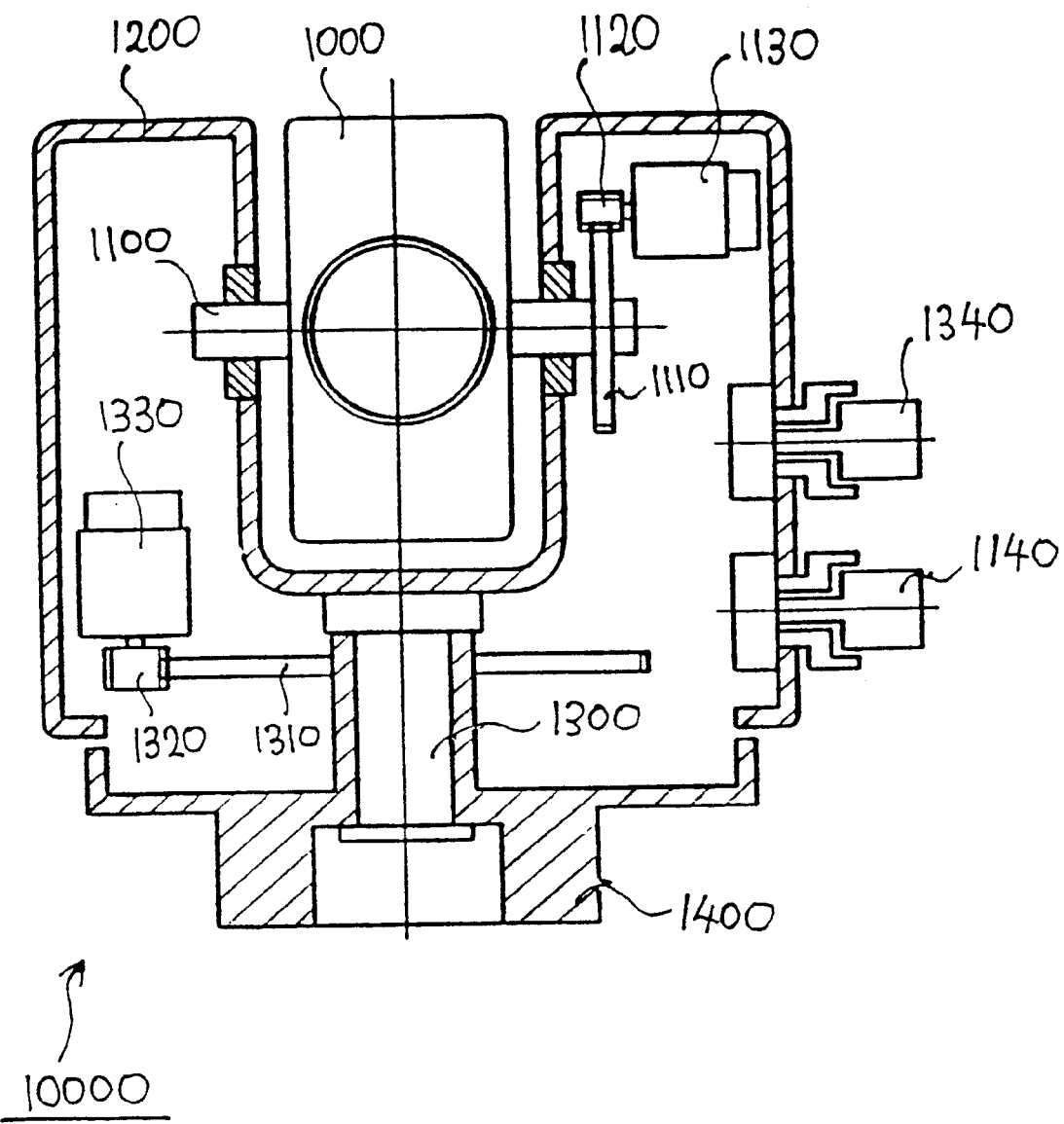
FIG. 1 is a schematic sectional view of an automatic surveying instrument in a preferred embodiment according to the present invention.

Referring to FIG. 1 showing an automatic surveying instrument 10000 in a preferred embodiment according to the present invention, the automatic surveying instrument 10000 comprises a collimating telescope 1000, horizontal pivots 1100 connected to the collimating telescope 1000 to support the collimation telescope 1000 for turning in a vertical plane, a frame 1200 supporting the horizontal pivots 1100 for turning thereon, a vertical shaft 1300 joined to the frame 1200, and a base 1400 supporting the vertical shaft 1300 for turning about a vertical axis thereon.

A first driven gear 1110 mounted on the horizontal pivot 1100 is engaged with a first drive gear 1120 mounted on the drive shaft of a vertical-drive motor 1130. The output torque of the vertical-drive motor 1130 is transmitted through the first driven gear 1110 to the horizontal pivot 1100.

The vertical-drive motor 1130 is controlled by a vertical turn control unit. A vertical turn control switch 1140 connected to the vertical turn control unit is operated by the operator to drive the vertical-drive motor 1130 for turning the horizontal pivot 1100. Consequently, the collimating telescope 1000 can be turned in a vertical plane relative to the frame 1200.

A second driven gear 1310 mounted on the vertical shaft 1300 is engaged with a second drive gear 1320 mounted on the drive shaft of the horizontal-drive motor 1330. The output torque of the horizontal-drive motor 1330 is transmitted through the second drive gear 1320 and the second driven gear 1310 to the vertical shaft 1300.

The horizontal-drive motor 1330 is controlled by a horizontal turn control unit. A horizontal turn control switch 1340 connected to the horizontal turn control unit is operated by the operator to drive the horizontal-drive motor 1330 for turning the vertical shaft 1300. Consequently, the collimating telescope 1000 can be turned in a horizontal plane relative to the base 1400.

Figure 2:
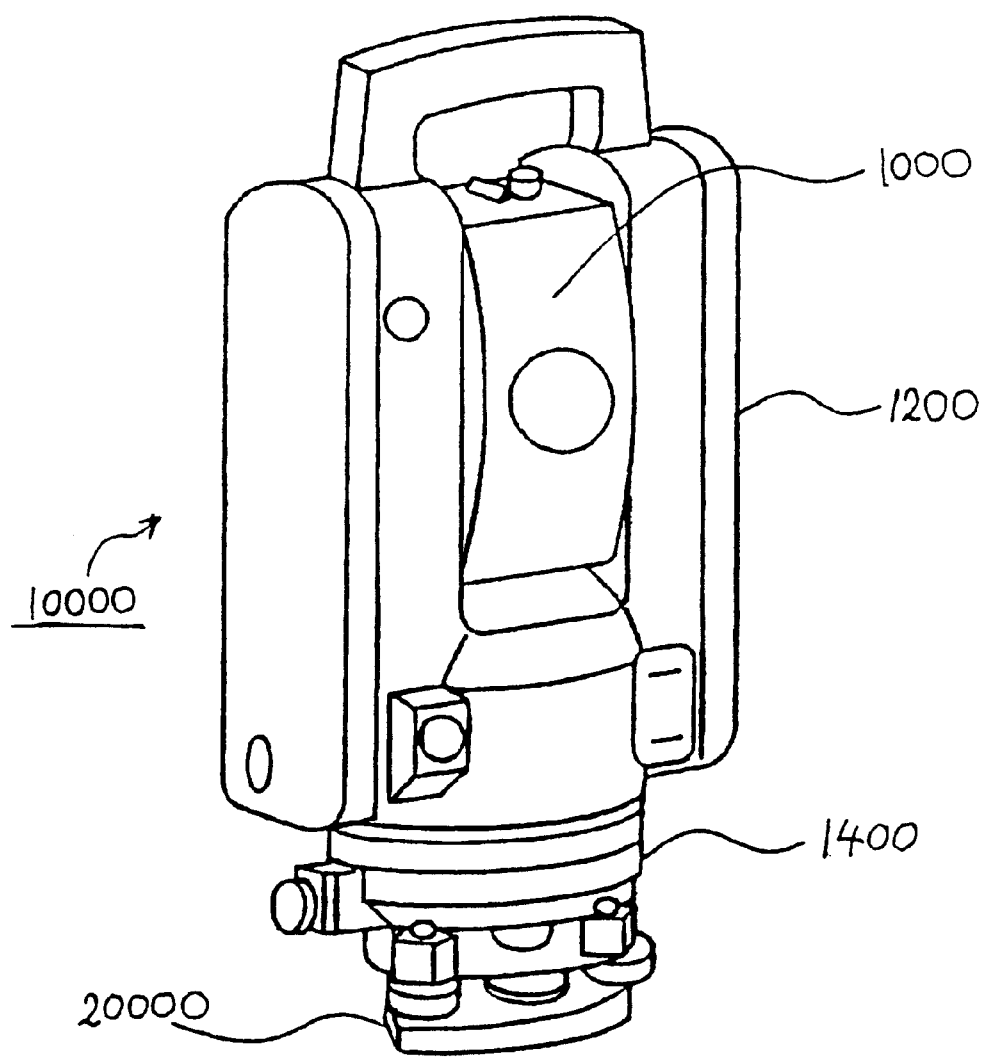
FIG. 2 is a perspective view of the automatic surveying instrument shown in FIG. 1.

Referring to FIG. 2, the base 1400 of the automatic surveying instrument 10000 is fixedly mounted on a leveling plate 20000 which in turn is attached to a tripod.

Figure 3:
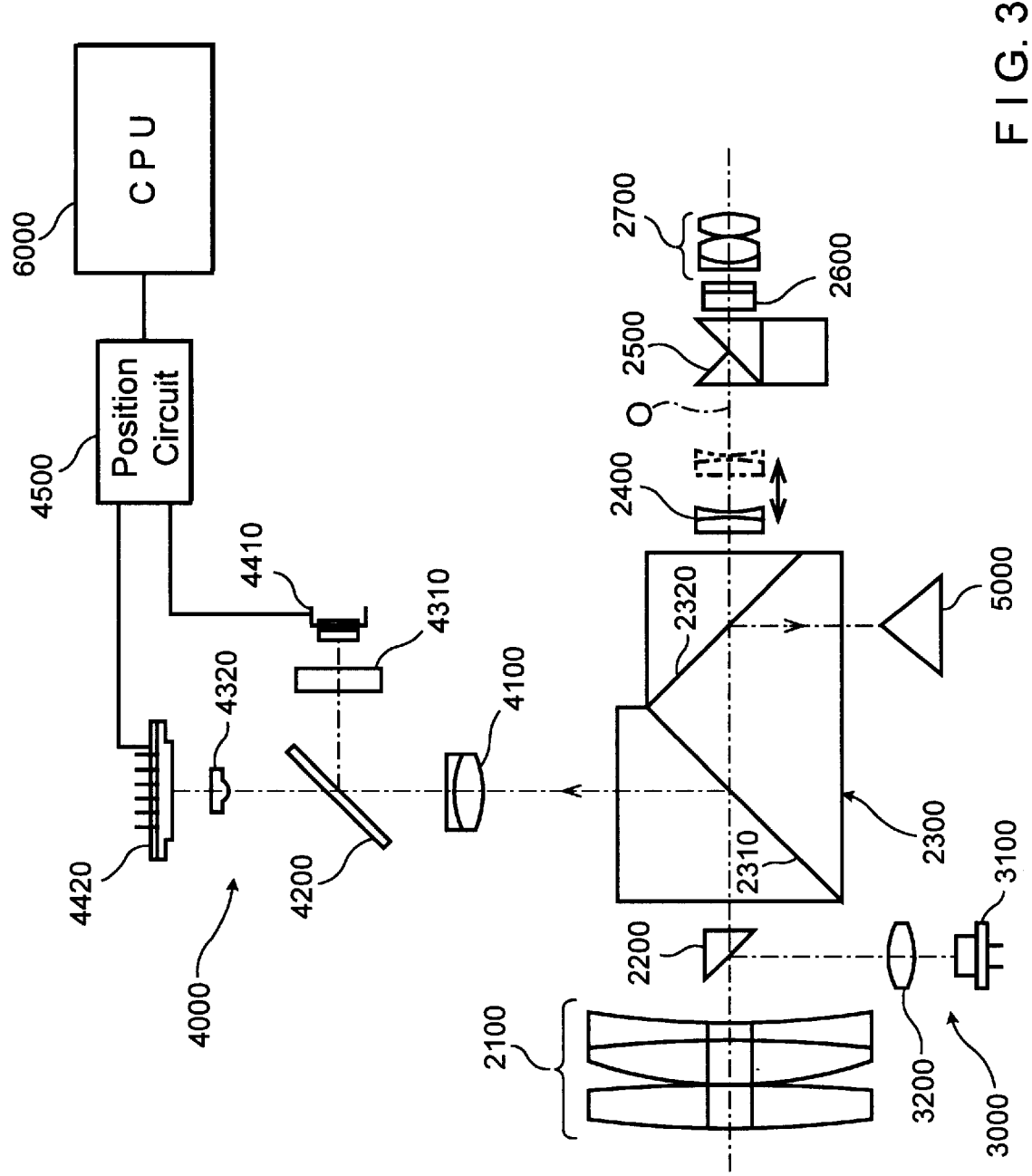
FIG. 3 is a diagrammatic view of an optical system included in the automatic surveying instrument shown in FIG. 1.

The optical construction of the automatic surveying instrument 10000 will be described with reference to FIG. 3.

The automatic surveying instrument 10000 comprises an objective 2100, a reflecting mirror 2200 for reflecting tracking light, a dichroic mirror 2300 for separating the tracking light and a distance measuring light from each other, a focusing lens 2400, an erecting prism 2500, a reticle 2600, an eyepiece 2700, a tracking light emitting system 3000, a tracking light receiving system 4000, a distance measuring optical system 5000 and an arithmetic control unit 6000.

The dichroic mirror 2300, i.e., a splitting optical device, has a first dichroic mirror surface 2310 for reflecting the incident tracking light, and a second dichroic mirror surface 2320 for separating the distance measuring light. The dichroic mirror 2300 transmits visible radiation, and the first dichroic mirror surface 1310 transmits infrared rays of at least one wavelength.

The first dichroic mirror surface 2310 reflects infrared rays of 650 nm in wavelength (tracking light) and transmits infrared rays of 800 nm in wavelength (distance measuring light). The second dichroic mirror surface 1320 reflects the infrared rays of 800 nm in wavelength (distance measuring light).

Collimating light (visible light) traveled through the objective 2100 penetrates the reflecting mirror 2200 and the dichroic mirror 2300, travels through the focusing lens 2400, the erecting prism 2500 and the reticle 2600, which are the basic components of the telescope, and reaches the eye through the eyepiece 2700. The focusing lens 2400 is disposed on an optical axis to focus the collimating light received through the objective 2100 on the reticle 2600. The erecting prism 2500 converts an inverted image so that an erect image is formed on the reticle 2600. A scale is formed on the reticle 2600 to adjust the telescope so that the object is set at the center of collimation. The eyepiece 2700 forms the images of the scale and the collimating light on the operator's retina. The optical system comprising those optical components corresponds to a collimating optical system.

The tracking light emitting system 3000 comprises a light emitting device 3100 and a collimator lens 3200. In this embodiment, the light emitting device 3100 emits pulses of infrared rays of 650 nm in wavelength. The wavelength of the tracking light may properly be determined.

The tracking light emitted by the light emitting device 3100 is collimated in a tracking light beam by the collimator lens 3200 and the tracking light beam falls on the reflecting mirror 2200. The tracking light beam reflected by the reflecting mirror 2200 travels through the objective 2100 toward the object. The reflecting mirror 2200 reflects infrared rays of 650 nm in wavelength (tracking light) and transmits visible radiation and infrared rays of 800 nm in wavelength(distance measuring light).

The tracking light beam reflected from the object travels through the objective 2100 and is reflected toward the tracking light receiving system 4000 by the first dichroic mirror surface 2310.

The tracking light receiving system 4000 comprises a relay lens 4100, a semitransparent mirror 4200, a first cylindrical lens 4310, a first photosensor 4410, a second cylindrical lens 4320 and a second photosensor 4420. In this embodiment, the first photosensor 4410 and the second photosensor 4420 are linear sensors. The first cylindrical lens 4310 and the second cylindrical lens 4320 serve as the first light condensing device and the second light condensing device, respectively.

The tracking light beam reflected by the first dichroic mirror surface 2310 travels through the relay lens 4100 and falls on the semitransparent mirror 4200. The semitransparent mirror 4200 splits an optical path into an optical path passing the first cylindrical lens 4310 and the first photosensor 4410, and an optical path passing the second cylindrical lens 4320 and the second photosensor 4420.

The first cylindrical lens 4310 gathers the tracking light in a predetermined direction so that the tracking light falls on the first photosensor 4410. The second cylindrical lens 4320 gathers the tracking light in a predetermined direction so that the tracking light falls on the second photosensor 4420. The first photosensor 4410 and the second photosensor 4420 are extended in directions perpendicular to each other, respectively. The first photosensor 4410 and the second photosensor 4420 serve as the first photodetector and the second photodetector, respectively.

The distance measuring light emitted by the distance measuring system 5000 is reflected by the second dichroic mirror surface 2320 of the dichroic mirror 2300 so as to travel along the optical axis through the first dichroic mirror surface 2310, the reflecting mirror 2200 and the objective 2100 toward the object. In this embodiment, the distance measuring optical system 5000 uses infrared rays of 800 nm in wavelength.

The distance measuring light reflected from the object travels through the objective 2100 and the first dichroic mirror surface 2310 of the reflecting mirror 2200, and is reflected by the second dichroic mirror surface 2320 of the dichroic mirror 2300 toward the distance measuring optical system 5000. The reflected distance measuring light is used for distance measurement.

Figure 4:
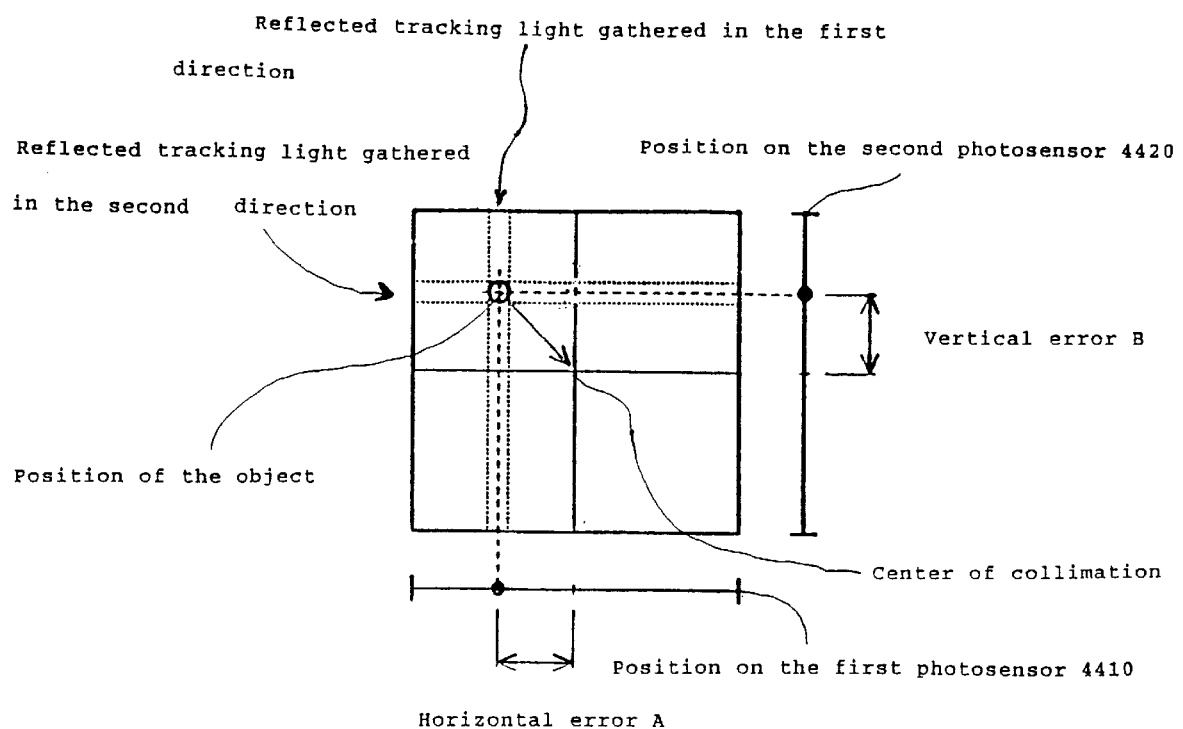
FIG. 4 is a diagrammatic view showing the relation between a tracking field and photodetectors.

FIG. 4 is a diagram showing the relation between a tracking field and a photosensor. The center of a cross in the tracking field indicates a collimation center. When tracking an object, such as a reflecting prism, the automatic surveying instrument 10000 is operated by the operator or is controlled so that the object lies on the collimation center.

When the tracking light in the tracking field is gathered in a horizontal direction, as viewed in FIG. 4, by the first cylindrical lens 4310, and the tracking light in the tracking field is gathered in a vertical direction, as viewed in FIG. 4, by the second cylindrical lens 4320, the horizontal and the vertical position of the object can be indicated in the tracking field. Therefore, a horizontal error A can be determined by gathering the tracking light in the horizontal direction in a horizontal line by the first cylindrical lens 4310 and forming an image of the horizontal line on the first photosensor 4410. Similarly, a vertical error B can be determined by gathering the tracking light in the vertical direction in a vertical line by the second cylindrical lens 4320 and forming an image of the vertical line on the second photosensor 4420. The horizontal direction in which the first cylindrical lens 4310 gathers the tracking light corresponds to the first direction, and the vertical direction in which the second cylindrical lens 4320 corresponds to the second direction.

Figure 5:
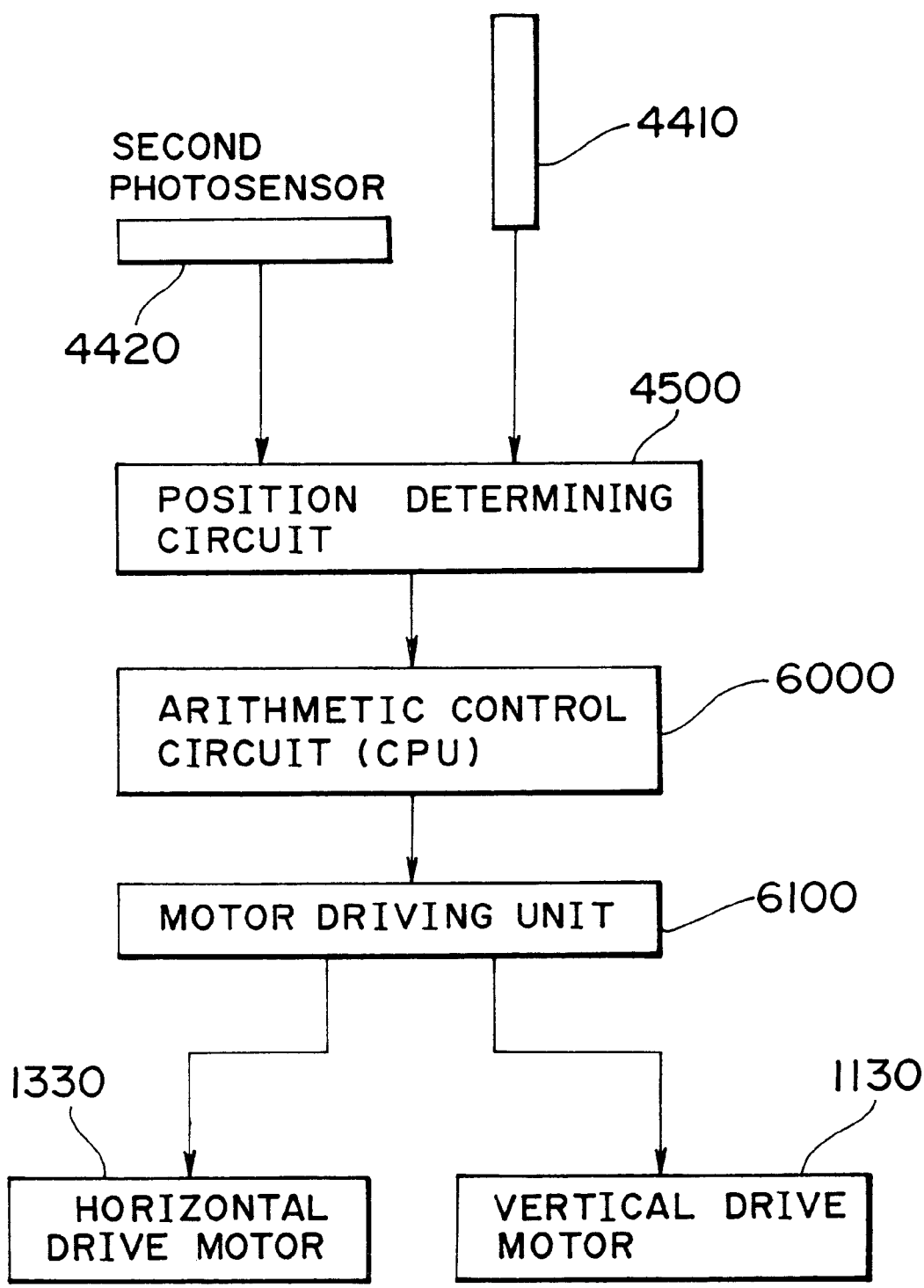
FIG. 5 is a block diagram of assistance in explaining the operation of the automatic surveying instrument shown in FIG. 1.

Referring to FIG. 5, the first photosensor 4410 gives a horizontal position signal indicating the horizontal error A to a position determining circuit 4500, and the second photosensor 4420 gives a vertical position signal indicating the vertical error B to the position determining circuit 4500. The position determining circuit 4500 determines the horizontal and the vertical position of the object. An arithmetic control unit 6000 is able to calculate errors of the position of the object from the collimated position on the basis of the position signals provided by the position determining circuit 4500.

The arithmetic control unit 6000 controls a motor drive unit 6100 to drive the vertical drive motor 1130 and the horizontal drive motor 1330 for the directional control of the automatic surveying instrument 10000 to collimate the automatic surveying instrument 10000. When the arithmetic control unit 6000 recognizes errors relative to the collimated position, the arithmetic control unit 6000 controls the motor drive unit 6100 to drive the vertical drive motor 1130 and the horizontal drive motor 1330 so as to reduce the errors, and to stop the same when the errors relative to the collimated position are reduced below a predetermined value. When the arithmetic control unit 6000 recognizes errors relative to the collimated position again, the arithmetic control unit 6000 controls the motor drive unit 6100 again to drive the vertical drive motor 1130 and the horizontal drive motor 1330 for error correction.

Thus, the object can be located at the collimation center by driving the vertical drive motor 1130 and the horizontal drive motor 1330.

According to the present invention, the photosensors of the tracking light receiving system 4000 receive the pulses of the tracking light emitted by the tracking light emitting system 3000 through the first cylindrical lens 4310 for horizontally gathering the tracking light and the second cylindrical lens 4320 for vertically gathering the tracking light. Thus the tracking light receiving system 4000 is capable detecting the tracking light by relatively simple photodetecting means.

The tracking light emitting system 3000 needs only to emit the pulses of tracking light, does not need any expensive acoustooptic device and any complicated circuit, and can be manufactured at a low cost.

The first photosensor 4410 and the second photosensor 4420 may be linear sensors, such as linear CCDs, which are very economical as compared with an expensive area sensor that needs to cover the entire tracking field.

The photodetecting system does not need any large-scale arithmetic unit for image processing and operates at a low power consumption rate and can satisfactorily be driven by a built-in power supply of the automatic surveying instrument 10000.

According to the present invention, the collimating optical system collimates the telescope toward the object, the splitting optical device splits incident light received from the collimating optical system and direct split beams of light toward the first photodetector and the second photodetector, the first condensing device disposed on an optical axis between the first photodetector and the splitting optical device gathers light in a first direction, the second condensing device disposed on an optical axis between the second photodetector and the splitting optical system gathers light in a second direction perpendicular to the first direction. Accordingly, the tracking light can be detected by relatively simple photodetecting means.

The first and the second photodetector may be linear sensors, such as linear CCDs, which are very economical as compared with an expensive area sensor that needs to cover the entire tracking field.

The photodetecting system does not need any large-scale arithmetic unit for image processing and operates at a low power consumption rate and can satisfactorily be driven by a built-in power supply of the automatic surveying instrument 10000.

What is claimed is:

1. A surveying instrument, comprising:
    a collimating optical system for collimating the surveying instrument with respect to an object;
    a light emitter for emitting tracking light;
    a projecting optical system for projecting said tracking light from said collimating optical system toward said object;
    a splitting optical device for splitting tracking light reflected by said object and incident via said collimating optical system;
    first and second light receiving devices;
    a first condensing device optically arranged between said splitting optical device and said first light receiving device for condensing tracking light in a first transverse direction; and
    a second condensing device optically arranged between said splitting optical device and said second light receiving device for condensing tracking light in a second transverse direction, optically perpendicular to said first transverse direction;
    wherein said first and second light receiving devices are arranged to receive light along first and second lines corresponding to said condensed tracking light from said first and second condensing devices.

2. A surveying instrument according to claim 1 wherein each of said first and second condensing devices comprise cylindrical lenses.

3. A surveying instrument according to claim 1 wherein said first and second light receiving devices comprise linear sensors arranged along said first and second lines.

* * * * *